June 8, 1954
C. A. ROTHBARD
2,680,320
FISHING LURE
Filed April 15, 1949
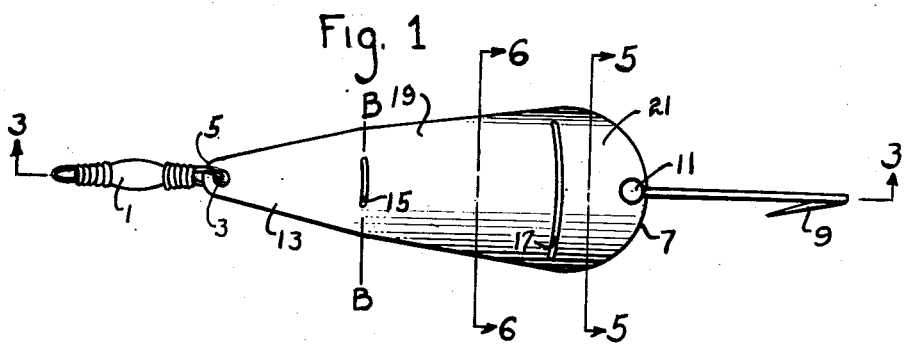
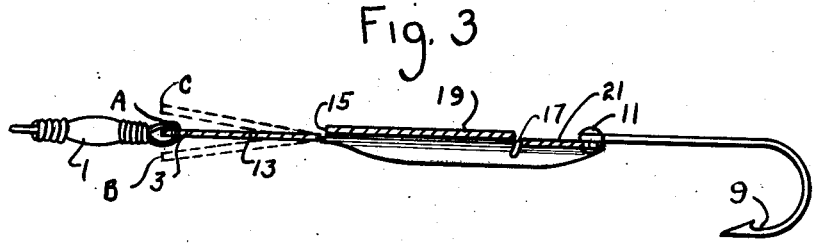
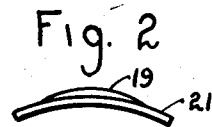
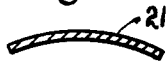 
CHARLES A. ROTHBARD
INVENTOR.
BY Edmund W. E. Kamm
ATTORNEY Patented June 8, 1954

2,680,320

UNITED STATES PATENT OFFICE 2,680,320

FISHING LURE

Charles A. Rothbard, Chicago, Ill.

Application April 15, 1949, Serial No. 87,749

15 Claims. (Cl. 43—42.06)

This invention relates to fishing lures. More specifically, it relates to a spinner for casting or trolling and which can be adjusted for either a deep water lure or as a surface lure.

An object of the invention is to make a spinner which has an attractive motion.

Yet another object is to make a spinner which will create considerable turbulence in the water.

Still another object is to provide a spinner which is adjustable at will so that it will run under the surface of the water at varying depths or will run on the surface.

These and other objects will become apparent from a study of this specification and the drawing which is attached hereto and made a part hereof and in which:

Figure 1 is a plan view of the lure.

Figure 2 is an end elevation viewed from the right of Figure 1.

Figure 3 is a longitudinal section taken on line 3—3 of Figure 1 showing the adjustments for the various actions.

Figure 4 is a side elevation of Figure 1.

Figure 5 is a transverse section taken on the line 5—5 of Figure 1 showing only the cross-sectional configuration of the lure at that position.

Figure 6 is a transverse section taken on the line 6—6 of Figure 1 showing only the cross-sectional configuration of the lure at that position.

Referring to the drawings, the numeral 1 represents a swivel of the usual construction which engages a hole 3 in the front end of the lure.

The body of the lure is preferably formed by die stamping it from sheet metal, such as a medium soft brass.

The body is formed with a small radius of curvature 5 at the front and a relatively large radius of curvature 7 at the trailing end and has a length of about 2½ times the large radius.

A hole is formed in the trailing end of the lure through its longitudinal axis and a hook 9 is fastened to the lure by a rivet 11, or a swivel, which enters the hole. Instead of a single hook, a double or treble hook may be used.

The front portion 13 of the lure is preferably flat up to the slot 15 which is described on a radius which is concentric with hole 3.

A second slot 17 is formed in the body and concentric with hole 3.

That portion 19 of the body which lies between the slots is concaved upwardly, while the portion 21 of the body which lies between slot 17 and the trailing end of the body is concaved upwardly, but has a larger radius than section 19 so that the former extends below the latter on the inner or concave side. In like manner the section 19 extends below the flat section 13 on the concave side so that they form, in effect, scoops which tend to force the water through the slots as the lure is drawn forwardly.

This causes the spinner to rotate about its longitudinal axis. Further, the water passing through the slots creates a turbulence which is attractive.

The length of slot 15 is approximately half the transverse width of the lure at the point where it is struck while slot 17 extends nearly to the edges of the lure.

When the front portion 13 lies substantially parallel to the lines formed by the lower edges of the other two portions, as shown at A, the lure will run at a normal depth, say about two feet under the surface of the water when drawn along at normal retrieving speed.

If it is desired to have the lure go deeper, as when it is being trolled, the front section is bent downwardly on the line B—B, to about the position B shown in Figure 3. The greater the degree of bend the greater the depth. This is limited, of course, by the position at which the lure is thrown so far out of position that it ceases to operate properly.

Should it be desired to use the lure as a surface bait, the front portion is bent about the line B—B to the C position, Figure 3. The force of the water then prevents the lure from sinking. It is in this position that the turbulence created by the slots is most effective.

In order to further illustrate the proportions of the lure, but not for purposes of limitation, I have made successful lures having an overall length of body of 3½ inches, having a ⅛ inch radius 5, a ⅝ inch radius 7, 3/64 inch wide slots 15 and 17, the former being struck on a radius of 1⅛ inches and the latter on a radius of 2⅝ inches, having a concaving radius in the body portion 19 of 11/16 inch and a radius of 1⅜ inches in the body portion 21.

The lure may, of course, be painted, burnished, plated or otherwise treated as desired.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A spinning lure comprising a body of deformable material having a substantially flat forward portion and a concavo-convex second portion connected thereto, said forward portion being adjustable relative to the second portion to regulate the depth at which the lure operates when it is drawn through the water, a hook attached to the body and said flat and second portions having between each other an elongated through slot struck from a center at the forward end of the body, formed in said body extending transversely thereof substantially on the line of juncture of said portions.

2. A spinning lure comprising a body of deformable material having a substantially flat forward portion and a concavo-convex second portion connected thereto, said forward portion being adjustable relative to the second portion to regulate the depth at which the lure operates when it is drawn through the water, a hook attached to the body and said flat and second portions having between each other an elongated through slot in said body extending transversely thereof substantially on the line of juncture of said portions, the leading edge of said second portion being offset from the forward portion at the slot to form a baffle at the trailing edge of the slot.

3. A spinning lure comprising a body of deformable material having a substantially flat forward portion and a concavo-convex second portion, said forward portion being adjustable relative to the second portion to regulate the depth at which the lure operates when it is drawn through the water, a hook attached to the body and said flat and second portions having between each other an elongated through slot in said body substantially on the line of juncture of said portions, said second portion being offset on the convex side, from the forward portion at the slot to form a baffle at the trailing edge of the slot.

4. A spinning lure comprising a body of deformable material having a substantially flat forward portion, a concavo-convex intermediate portion and a concavo-convex rear portion, said forward portion being adjustable relative to the intermediate portion to regulate the depth at which the lure operates when drawn through the water, a hook attached to the body, said flat and intermediate portions having between each other a through slot extending transversely thereof substantially at the juncture of said forward and intermediate portions and said intermediate and rear portions having between each other a second through slot extending transversely thereof substantially at the juncture of said intermediate and rear portions, said slots being arcuate and struck from a center at the front of said forward portion.

5. A spinning lure comprising a body of deformable material having a substantially flat forward portion, a concavo-convex intermediate portion and a concavo-convex rear portion, said forward portion being adjustable relative to the intermediate portion to regulate the depth at which the lure operates when drawn through the water, a hook attached to the body, said flat and intermediate portions having between each other a through slot substantially at the juncture of said forward and intermediate portions and said intermediate and rear portions having between each other a second through slot substantially at the juncture of said intermediate and rear portions, said intermediate portion being offset above the forward portion at the trailing edge of the first mentioned slot and said rear portion being offset from said intermediate portion at the trailing edge of the second slot.

6. A spinning lure comprising a body of deformable material having a substantially flat forward portion, a concavo-convex intermediate portion and a concavo-convex rear portion, said forward portion being adjustable relative to the intermediate portion to regulate the depth at which the lure operates when drawn through the water, a hook attached to the body, said flat and intermediate portions having between each other a through slot substantially at the juncture of said forward and intermediate portions and said intermediate and rear portions having between each other a second through slot substantially at the juncture of said intermediate and rear portions, said intermediate portion being offset from the forward portion on the convex side and at the trailing edge of the first mentioned slot to force water through the slot to the convex side, said rear portion being offset from the intermediate section on the concave side and at the trailing edge of the second slot to force water to the convex side.

7. A spinning lure comprising a body of deformable material having a substantially flat forward portion, a concavo-convex intermediate portion and a concavo-convex rear portion, said forward portion being adjustable relative to the intermediate portion to regulate the depth at which the lure operates when drawn through the water, a hook attached to the body, said flat and intermediate portions having between each other a through slot substantially at the juncture of said forward and intermediate portions and said intermediate and rear portions having between each other a second through slot substantially at the juncture of said intermediate and rear portions, said intermediate portion being concavo-convex and having its concave side adjacent the first mentioned slot extending above the first portion, said rear portion being concavo-convex but having a greater radius of curvature than that of the intermediate portion so that the trailing edge of the second slot lies below the intermediate portion.

8. A spinning lure comprising an elongated tear shaped body comprising a flat forward end portion, an intermediate concavo-convex portion and a rear concavo-convex portion, the radius of concavity of the rear portion being greater than that of the intermediate portion and said forward end, intermediate portion and rear portion having between each other through slots at the junctures of the portions whereby the forward ends of the intermediate and rear portions will be offset from the forward and intermediate portions respectively.

9. A spinning lure comprising an elongated tear shaped body comprising a flat forward end portion, an intermediate concavo-convex portion and a rear concavo-convex portion, the radius of concavity of the rear portion being greater than that of the intermediate portion and said forward end, intermediate portion and rear portion having between each other through slots at the junctures of the portions whereby the forward ends of the intermediate and rear portions will be offset outwardly and inwardly from the forward and intermediate portions respectively, along the radius of concavity.

10. A spinning lure comprising an elongated tear shaped body comprising a flat forward end portion, an intermediate concavo-convex portion and a rear concavo-convex portion, the radius of concavity of the rear portion being greater than that of the intermediate portion and said forward end, intermediate portion and rear portion having between each other through slots at the junctures of the portions whereby the forward ends of the intermediate and rear portions will be offset radially outward and inward from the forward and intermediate portions respectively, said slots being arcuate and struck on a center at the forward end of the forward portion and on the longitudinal axis of the body.

11. A spinning lure comprising a body of deformable material having a substantially flat forward portion, means for connecting a line to the front end of said forward portion and concavo-convex intermediate and rear portions connected thereto, said intermediate and rear portions constituting a portion of a cylindrical body having its axis substantially parallel to the axis of the first mentioned body, said forward portion being adjustable relative to the intermediate portion substantially along the line of juncture of said last mentioned portions to regulate the depth at which the lure operates when it is drawn through the water and a hook attached to the body.

12. A spinning lure comprising a body of deformable material having a substantially flat forward portion, means for connecting a line to the front end of said portion, a concavo-convex intermediate portion and a concavo-convex rear portion, said intermediate and rear portions each constituting a portion of a cylindrical body having its axis substantially parallel to the axis of the first mentioned body, said rear portion having a different radius of curvature than the intermediate portion, said forward portion being adjustable relative to the intermediate portion to regulate the depth at which the lure operates when drawn through the water and a hook attached to the body.

13. A spinning lure comprising a body of deformable material having a substantially flat forward portion, means for connecting a line to the front end of said portion, a concavo-convex intermediate portion and a concavo-convex rear portion, said intermediate and rear portions each constituting a portion of a cylindrical body having its axis substantially parallel to the axis of the first mentioned body, said forward portion being adjustable relative to the intermediate portion to regulate the depth at which the lure operates when drawn through the water, a hook attached to the body, a transverse slot formed substantially at the juncture of said forward and intermediate portions and a second transverse slot formed substantially at the juncture of said intermediate and rear portions.

14. A spinning lure comprising an elongated tear shaped body comprising a flat forward end, an intermediate concavo-convex portion and a rear concavo-convex portion, said intermediate and rear portions each constituting a portion of a cylindrical body having its axis substantially parallel to the axis of the first mentioned body, the radii of the two portions, transverse to the longitudinal axis of the lure, being different.

15. A spinning lure comprising an elongated tear shaped body comprising a flat forward end, an intermediate concavo-convex portion and a rear concavo-convex portion, said intermediate and rear portions each constituting a portion of a cylindrical body having its axis substantially parallel to the axis of the first mentioned body, the radius of concavity of the rear portion, transversely of the longitudinal axis of the lure, being greater than that of the intermediate portion.

References Cited in the file of this patent

UNITED STATES PATENTS

| Number | Name | Date |
|---|---|---|
| 916,691 | Fey | Mar. 30, 1909 |
| 1,352,054 | Dills | Sept. 7, 1920 |
| 1,624,116 | Putnam et al. | Apr. 12, 1927 |
| 1,778,214 | Fisher | Oct. 14, 1930 |
| 1,803,056 | Davis | Apr. 28, 1931 |
| 1,861,905 | Bergstedt | June 7, 1932 |
| 1,883,695 | Goerke | Oct. 18, 1932 |
| 1,903,256 | Catarau | May 28, 1933 |
| 2,507,454 | Nelson | May 9, 1950 |
| 2,507,772 | Cummins | May 16, 1950 |
| 2,519,048 | Janisch | Aug. 15, 1950 |